US012573047B2

(12) United States Patent
    Chen

(10) Patent No.: US 12,573,047 B2
(45) Date of Patent: Mar. 10, 2026

(54) CONTROL METHOD, DEVICE, EQUIPMENT AND STORAGE MEDIUM FOR INTERACTIVE REPRODUCTION OF TARGET OBJECT

(71) Applicant: SI CHUAN ZHONG SHENG MATRIX TECHNOLOGY DEVELOPMENT CO., LTD., Chengdu (CN)

(72) Inventor: Zhengquan Chen, Chengdu (CN)

(73) Assignee: SI CHUAN ZHONG SHENG MATRIX TECHNOLOGY DEVELOPMENT CO., LTD., Chengdu (CN)

( * ) Notice: Subject to any disclaimer, the term of this patent is extended or adjusted under 35 U.S.C. 154(b) by 563 days.

(21) Appl. No.: 18/149,678

(22) Filed: Jan. 4, 2023

(65) Prior Publication Data

US 2023/0386041 A1     Nov. 30, 2023

(30) Foreign Application Priority Data

May 24, 2022     (CN) ......................... 202210566832.4

(51) Int. Cl.
    *G06T 7/10*          (2017.01)
    *G06F 16/583*     (2019.01)
    *G06T 7/80*          (2017.01)
(52) U.S. Cl.
    CPC ............ *G06T 7/10* (2017.01); *G06F 16/5854* (2019.01); *G06T 7/80* (2017.01)
(58) Field of Classification Search
    CPC .. G06T 7/10; G06T 7/80; G06T 19/00; G06T 17/00; G06T 15/005; G06T 19/20;
(Continued)

(56) References Cited

U.S. PATENT DOCUMENTS

2018/0143693 A1*   5/2018   Calabrese ............ G06V 40/193
2020/0168138 A1*   5/2020   Yoon ....................... G06F 3/012

FOREIGN PATENT DOCUMENTS

CN          110473285 A       11/2019
CN          111325796 A   *   6/2020     ........... G06F 16/583

OTHER PUBLICATIONS

European Search Report of Counterpart European Patent Application No. 23151524.8 issued on Oct. 4, 2023.

* cited by examiner

*Primary Examiner* — Chan S Park
*Assistant Examiner* — Daniel C Chang

(57)          ABSTRACT

A control method, device, equipment and storage medium for interactive reproduction of a target object is provided. The control method comprises: acquiring a control instruction of the target object, the control instruction including a plurality of direction control parameters; acquiring target image information of the target object according to the combination of the plurality of direction control parameters, the target image information being acquired through a preset three-dimensional reproduction method; performing interactive reproduction on the target object based on the direction control parameters and the target image information. Through acquiring any combination of the plurality of control parameters input by a user according to an interaction requirement, the movement and reproduction of the target object in multiple directions and under any visual angle based on the high-precision target image information obtained based on the preset three-dimensional reproduction method at any moment or within a period of time can be controlled.

8 Claims, 5 Drawing Sheets

(58) Field of Classification Search
CPC ....... G06T 2200/08; G06T 7/136; G06T 7/73;
G06F 16/5854; G06F 3/017; G06F 3/011;
Y02P 90/02; G11B 27/031
See application file for complete search history.

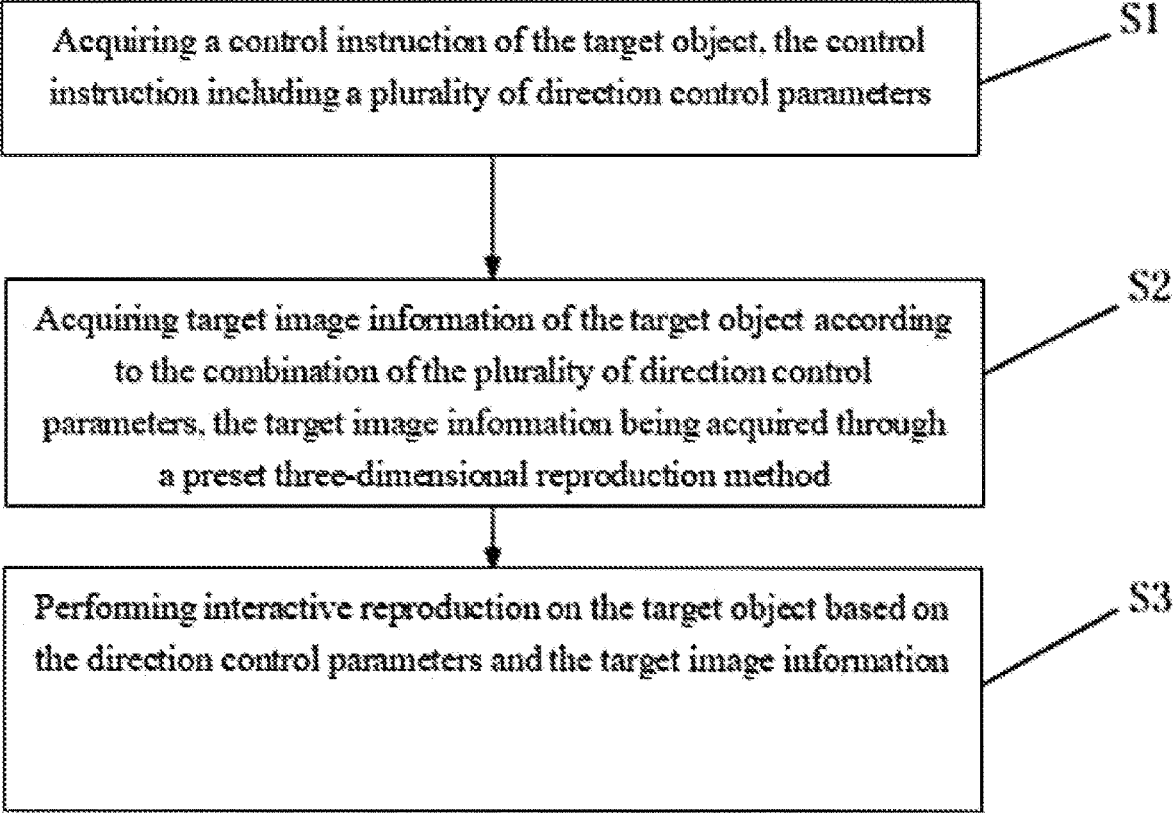

Acquiring a control instruction of the target object, the control instruction including a plurality of direction control parameters — S1

Acquiring target image information of the target object according to the combination of the plurality of direction control parameters, the target image information being acquired through a preset three-dimensional reproduction method — S2

Performing interactive reproduction on the target object based on the direction control parameters and the target image information — S3

FIG. 2

CONTROL METHOD, DEVICE, EQUIPMENT AND STORAGE MEDIUM FOR INTERACTIVE REPRODUCTION OF TARGET OBJECT

CROSS REFERENCE TO RELATED APPLICATIONS

The present application claims the benefit of Chinese Patent Application No. 202210566832.4 filed on May 24, 2022, the contents of which are incorporated herein by reference in their entirety.

FIELD OF THE INVENTION

The present invention relates to the field of three-dimensional images, particularly to a control method, device, equipment and storage medium for interactive reproduction of a target object.

BACKGROUND OF THE INVENTION

At present, the acquisition method of three-dimensional data is to present the generated data in the form of Surface or Pointcloud by three-dimensional scanning and modeling using appropriate technique according to the characteristics of the object. However, the existing three-dimensional scanning and modeling technology, on the one hand, cannot accurately collect the texture and size of objects, and the accuracy is low, resulting in poor 3D rendering effects; and on the other hand, the three-dimensional presentation method is relatively simple, which is not conducive to 360-degree all-round and high-precision interactive display, and difficult to meet the needs of users, leading to poor user experiences.

SUMMARY OF THE INVENTION

An object of the present invention is to provide a control method, device, equipment and storage medium for interactive reproduction of a target object, which are convenient for a user to interactively control the target object to perform omnibearing and high-precision reproduction, thus improving the user experience.

In a first aspect, the present invention provides a control method for interactive reproduction of a target object, which includes the following steps:

S1, acquiring a control instruction of the target object, the control instruction including a plurality of direction control parameters;

S2, acquiring target image information of the target object according to the combination of the plurality of direction control parameters, the target image information being acquired through a preset three-dimensional reproduction method;

S3, performing interactive reproduction on the target object based on the direction control parameters and the target image information.

Further, the plurality of direction control parameters include a first direction control parameter, a second direction control parameter and a time control parameter.

Further, the control instruction further includes a visual angle control parameter.

Further, the target image information includes first image information, and the step of acquiring the first image information through the preset three-dimensional reproduction method includes:

calculating visual angle boundaries of the target object under a plurality of visual angles;

acquiring the image information of the target object under the plurality of visual angles in the visual angle boundary;

performing boundary processing on the image information to obtain the first image information of the target object under the plurality of visual angles.

Further, the target image information further includes second image information, and the step of acquiring the second image information through the preset three-dimensional reproduction method includes:

controlling an acquisition device to acquire the image information under the plurality of visual angles according to a preset acquisition rule;

segmenting and fusing the image information under the same visual angle to obtain fused image information;

acquiring the fused image information under the plurality of visual angles to form the second image information of the target object.

Further, the method further includes:

establishing an attribute number for the first image information and/or the second image information, and storing the image information in a preset position according to the attribute number.

Further, the acquiring the target image information of the target object according to the combination of the plurality of direction control parameters includes:

obtaining the attribute number based on the first direction control parameter and/or the second direction control parameter and/or the visual angle control parameter and the time control parameter; and acquiring the target image information corresponding to the target object from the preset position according to the attribute number.

Further, the performing interactive reproduction on the target object based on the direction control parameters and the target image information includes:

establishing a coordinate system based on the first direction control parameter, the second direction control parameter, the visual angle control parameter and/or the time control parameter;

performing interactive reproduction on the target object in the coordinate system by the target image information.

In a second aspect, the present invention provides a control device for interactive reproduction of a target object, which comprises:

a first acquisition module which is used for acquiring the control instruction of the target object, the control instruction including the plurality of direction control parameters;

a second acquisition module which is used for acquiring target image information of the target object according to the combination of the plurality of direction control parameters, the target image information being acquired through the preset three-dimensional reproduction method;

a reproduction module which is used for performing interactive reproduction on the target object based on the target image information.

In a third aspect, an embodiment of the present invention provides a computer device. The computer device includes a memory, a processor and a computer program which is stored on the memory and can run on the processor, and the processor is used for executing the computer program to achieve the steps in the control method for interactive reproduction of the target object.

In a fourth aspect, an embodiment of the present invention provides a computer readable storage medium, the computer program is stored on the computer readable storage medium, and the computer program is executed by the processor to achieve the steps in the control method for interactive reproduction of the target object.

Compared with the prior art, the embodiment of the present invention has the following main beneficial effects:

(1) any combination of the plurality of control parameters input by a user according to an interaction requirement is acquired; the movement and reproduction of the target object in multiple directions and under any visual angle based on the high-precision target image information obtained based on the preset three-dimensional reproduction method at any moment or within a period of time can be controlled, thus the user can statically or dynamically observe and interactively control the target object under any visual angle in an omnibearing and high-precision manner according to the interaction requirement, and as a result, the experience feeling of the user for controlling the target object is improved;

(2) the acquisition distance between the acquisition device and the target object under the same visual angle is acquired; the acquisition distance is segmented according to a preset number to acquire corresponding segmented image information, and the plurality of segmented images are fused, so that the obtained image information is clearer, the information such as texture, texture and size of the target object is better reserved, the image precision is improved, the carried noise information is less, the reproduction of the target object under interactive control can be more smoothly and quickly, and as a result, the user experience is further improved.

BRIEF DESCRIPTION OF THE DRAWINGS

In order to illustrate the embodiments of the present disclosure or the technical solutions in the prior art more clearly, the accompanying drawings used in the embodiments or the description of the prior art will be briefly described below. Obviously, the accompanying drawings in the following description are only a part of embodiments of the present invention, and for persons of ordinary skill in the art, other drawings can be obtained based on these accompanying drawings without creative efforts.

FIG. 2 is a flow chart of an embodiment of a control method for interactive reproduction of a target object in the present invention;

In FIG. 1, 101, mobile terminal, 102, tablet terminal, 103, computer terminal, 104, network, 105, server;

In FIG. 5, 501, first acquisition module, 502, second acquisition module, 503, reproduction module;

In FIG. 6, 61, memory, 62, processor, 63, network interface.

DETAILED DESCRIPTION

The following description provides a plurality of different embodiments, or examples, for implementing the various features of the present invention. The elements and arrangements described in the following specific examples are merely used to describe the present invention concisely and are only used as examples rather than limiting the present invention.

In order to enable those skilled in the art to better understand the technical solutions of the present application, the technical solutions in the embodiments of the present application will be clearly and completely described below in conjunction with the accompanying drawings.

Figure 1:
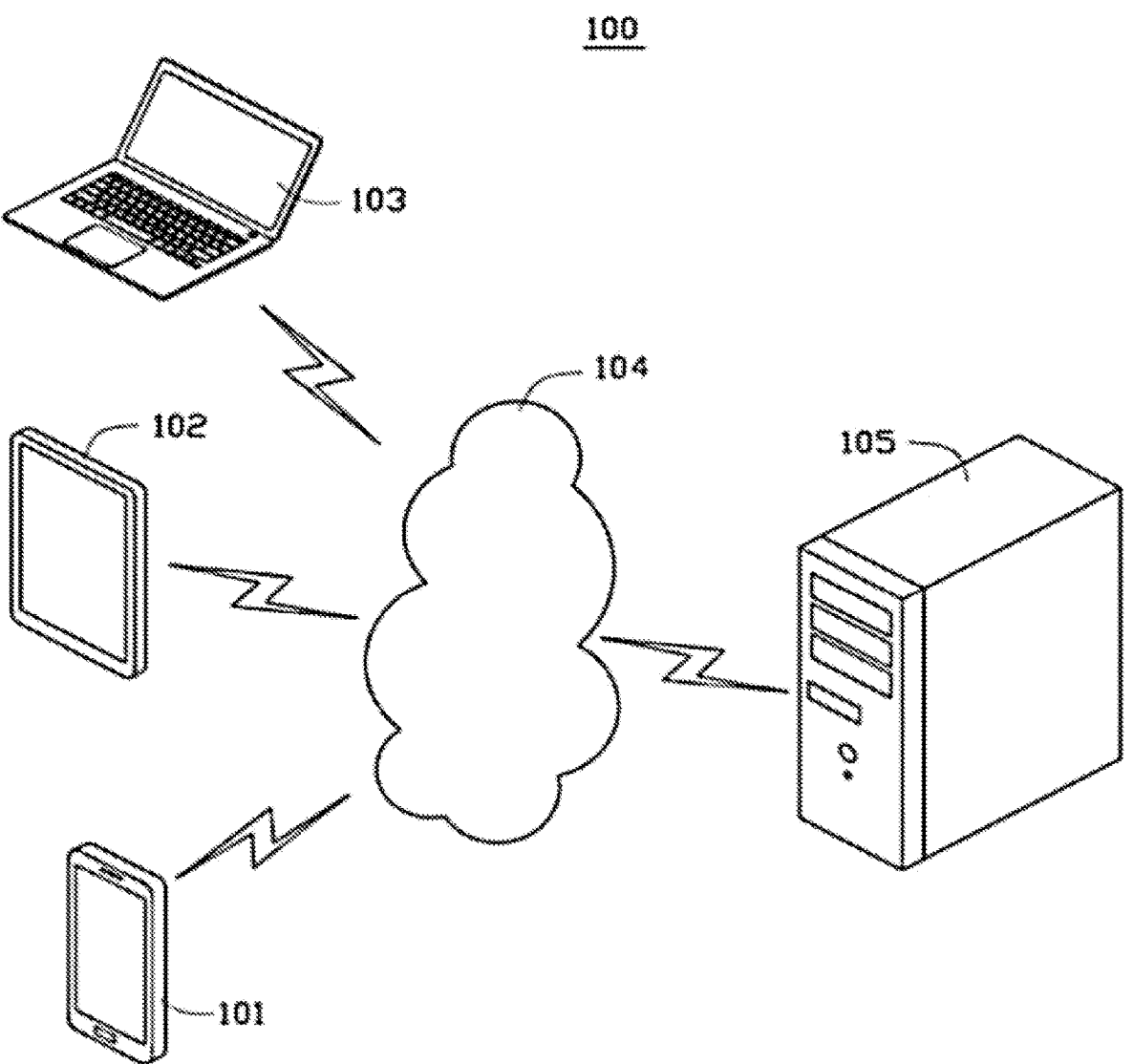
FIG. 1 is an exemplary system architecture diagram in which the present invention can be applied.

As shown in FIG. 1, FIG. 1 is an exemplary system architecture diagram that the present invention can be applied to, a system architecture 100 can include a terminal device, a network 104, and a server 105, and the terminal device can include a mobile phone terminal 101, a tablet terminal 102, and a computer terminal 103. The network 104 is configured to provide a medium of a communication link between the terminal device and the server 105. The network 104 can include various connection types, such as wired, wireless communication links or fiber optic cables.

A user can use terminal equipment such as the mobile phone terminal 101, the tablet terminal 102 and the computer terminal 103 to interact with the server 105 through the network 104 so as to receive or transmit messages and the like. Various communication client applications such as a webpage browser, an instant messaging tool, a client APP and a command line tool can be installed on the terminal equipment, or a control method for interactive reproduction of a target object is directly operated, and interactive reproduction of the target object is controlled locally offline on the terminal equipment.

The terminal equipment can be various electronic equipment which is provided with a display screen and supports webpage browsing and APPs, including but not limited to a smart phone, a tablet personal computer, an electronic book reader, a portable computer, a desktop computer and the like.

The server 105 can be a server for providing various services, such as a background server for providing support for a page or an APP displayed on the terminal equipment.

It should be noted that the control method for interactive reproduction of the target object provided by an embodiment of the present invention can be executed by the server and can also be executed by the terminal equipment locally offline, and correspondingly, a control device for interactive reproduction of the target object can be arranged in the server and can also be arranged in the terminal equipment.

It is to be understood that the number of terminal equipment, networks and servers in FIG. 1 is only schematic. According to the implementation needs, any number of terminal equipment, networks and servers can be provided.

As shown in FIG. 2, FIG. 2 is a flow chart of one embodiment of the control method for interactive reproduction of the target object of the present invention. The control method for interactive reproduction of the target object includes:

S1, acquiring a control instruction of the target object, the control instruction including a plurality of direction control parameters;

S2, acquiring target image information of the target object according to the combination of the plurality of direction control parameters, the target image information being acquired through a preset three-dimensional reproduction method;

S3, performing interactive reproduction on the target object based on the direction control parameters and the target image information.

In the embodiment of the present invention, the user can input a control instruction of the target object through the terminal equipment in the system architecture 100 as shown in FIG. 1, and then the method provided by the present invention is executed locally on the terminal equipment; or the method provided by the present invention is executed on the server 105, and the control instruction of the target object transmitted by the terminal equipment is received through the network 104. The control instruction of the target object has a plurality of forms, for example, a file (such as XML, JSON and HTML) in a specific format, or a character string command input by a terminal command line, or operation instructions such as clicking, dragging and sliding of the user obtained through a GUI (graphical user interface); the form and content of the specific control instruction of the target object can be specifications preset according to the interaction requirement of the user, so that subsequent corresponding analysis is conveniently performed according to the specifications to obtain correct control instruction content. The control instruction of the target object includes a plurality of direction control parameters; target image information of the target object is acquired through the direction control parameters and combinations thereof; and the movement and reproduction of the target object in the corresponding direction can be controlled based on the acquired target image information.

Further, the plurality of direction control parameters include a first direction control parameter, a second direction control parameter and a time control parameter. The first direction control parameter is used for controlling the target object to move in the first direction and displaying the target image information of the target object in the first direction, and the second direction control parameter is used for controlling the target object to move in the second direction and displaying the target image information of the target object in the second direction, wherein the first direction and the second direction can be any direction, can also be any two orthogonal directions of the target object in a three-dimensional rectangular coordinate system, such as an X direction and a Y direction, and the X direction and a Z direction in an XYZ coordinate system, and can also be a U direction and a V direction in a UVW coordinate system. In order to better understanding, the UVW coordinate system is used in the embodiment of the present invention to represent the direction control parameters, and a W direction is used for representing the time control parameter, which is used for controlling the movement and reproduction of the target object in the first direction and/or the second direction at any time or within a period of time. The plurality of control parameters can be used respectively; for example, the control parameters in the U direction can be independently used for acquiring the target image information in the U direction, the movement and reproduction of the target object in the U direction can be controlled based on the acquired target image information in the U direction; or the combination can also be used, the combination of the control parameters in the U direction and the V direction can be used for obtaining corresponding target image information and controlling the movement and reproduction of the target object in the U direction and/or the V direction based on the acquired target image information at the same time; the combination of the U-direction control parameter or the V-direction control parameter and the time control parameter can be used for controlling the static reproduction of the target object in the U or V direction based on the acquired target image information only at a certain moment, or controlling the dynamic production of the target object in the U or V direction based on the acquired target image information within a certain time period, and thus the user can statically or dynamically observe the target object and the change condition of the target object from multiple directions according to requirements.

Further, the control instruction further includes a visual angle control parameter, and the visual angle control parameter is used for controlling any reproduction visual angle of the target object. The visual angle control parameter can be randomly combined with the first direction control parameter, the second direction control parameter and the time control parameter to control the movement and reproduction of the target object in the first direction and/or the second direction under any visual angle based on the obtained target image information at any moment or within a period of time, so that the user can observe the target object and the change condition of the target object under any visual angle in a static or dynamic and omnibearing manner according to requirements, and the experience feeling of the user for interactively controlling the target object is improved.

It should be noted that, the target image information includes first image information, and the step of acquiring the first image information through the preset three-dimensional reproduction method includes:

calculating visual angle boundaries of the target object under a plurality of visual angles;

acquiring the image information of the target object under the plurality of visual angles in the visual angle boundary;

performing boundary processing on the image information to obtain the first image information of the target object under the plurality of visual angles.

In the embodiments of the present invention, before the target object is acquired by an acquisition apparatus, in order to reduce the influence of redundant interference information during target object acquisition, it is needed to calculate the visual angle boundaries of the target object under different visual angles. For example, the visual angles for target object acquisition include a visual angle 1, a visual angle 2, a visual angle 3, a visual angle 4 and a visual angle N. In case of acquiring image information of the target object under the visual angle 1, firstly an image of the target object displayed under the visual angle 1 is acquired, then a central position of the target object in the image of the target object displayed under the visual angle 1 is calculated, then a corresponding maximum boundary radius is calculated by taking the central position as a circle center, and an edge of a circle (or a sphere) formed by the maximum boundary radius is taken as a visual angle boundary, and thus the target object can be completely contained in the formed corresponding visual angle boundary. In order to better understand, it is assumed that the image of the target object displayed under the visual angle 1 is a rectangle, then the central position of the rectangle is calculated, the central position is taken as the circle center, the maximum boundary radius (circumscribed radius) based on the circle center is calculated, namely, the circumscribed circle of the rectangle, and the edge of the circumscribed circle is taken as the visual angle boundary, and thus the rectangle is completely contained in the circumscribed circle; the image of the target object displayed under the visual angle 2 is a triangle, then the central position of the triangle is calculated, the central position is taken as the circle center, the maximum boundary radius (circumscribed radius) based on the circle center is calculated, namely, the circumscribed circle of the triangle, and the edge of the circumscribed circle is taken as the visual angle boundary, and thus the triangle is completely contained in the circumscribed circle. Further, the maximum boundary radiuses of the target object under each visual angle are compared, the longest maximum boundary radius is selected as a target maximum boundary radius, a formed spherical visual angle boundary completely wraps the target object, and accordingly, the image information of the target object under each visual angle is acquired; certainly, an ellipse (or ellipsoid) edge formed by combining the maximum boundary radiuses under any two or more visual angles can be taken as the visual angle boundary, and the image information of the target object under each visual angle is acquired in this visual angle boundary; finally, boundary processing, such as image cutting, is performed on the obtained image information of the target object under the plurality of visual angles in the visual angle boundary, to obtain the first image information of the target object under the corresponding visual angles.

It should be noted that the step of performing image segmentation on the image information in the embodiment of the present invention specifically includes: calculating a target area in the acquired image information, the target area being an area formed by the boundary of the target object, specifically, calculating the target area by an existing image segmentation method based on deep learning, no more details being illustrated herein; segmenting the area without the target object to acquire image information in the target area which only contains the target object; and segmenting off the area without the target object in each piece of acquired image information under the same visual angle so as to obtain the image information which only contains the target object; and according to these steps, the first image information only containing the target object under multiple visual angles can be obtained, the boundary noise information amount carried by the first image information is greatly reduced, the reproduced information amount of the target object is greatly reduced, the reproduced image loading time is saved, the efficiency of controlling reproduction of the target object is improved, and therefore the user experience is further improved. Certainly, the step of performing image segmentation further includes: segmenting the acquired first image information into a plurality of pieces of sub-image information, splicing the sub-images according to needs when the target object is controlled to reproduce, and restoring the sub-images into corresponding first image information.

The shapes of images displayed by the target object at different visual angles can be completely same, partially same or completely different, and the different visual angles can be set according to different reproduction requirements of the user for the target object.

The acquisition device in the embodiment of the present invention can be a photographing device, a camera and other entities, can also be a virtual camera (the virtual camera can be used for acquiring image information of a virtual target object) and the like, and it only needs to acquire the image information of the target object, and specific limitation is not made herein.

In the embodiments of the present invention, before the image information of the target object is acquired, firstly, the maximum boundary radius of the display image of the target object under the corresponding visual angle is calculated, the edge formed by the maximum boundary radius is taken as the visual angle boundary, the display image of the target object under the corresponding visual angle is contained in the visual angle boundary, so that redundant information, outside the visual angle boundary, of the target object under the corresponding visual angle is removed in the collection of the image information of the target object, only required information is acquired, and as a result, the influence of other information on subsequent three-dimensional reconstruction is avoided, and the information amount of the image to be stored is reduced.

Further, the target image information further includes second image information, and the step of acquiring the second image information through the preset three-dimensional reproduction method includes:

controlling an acquisition device to acquire the image information under the plurality of visual angles according to a preset acquisition rule;

segmenting and fusing the image information under the same visual angle to obtain fused image information;

acquiring the fused image information under the plurality of visual angles to form the second image information of the target object.

In the embodiments of the present invention, after calculating the visual angle boundary of the target object in the display image under different visual angles, the acquisition device is used to acquire the image information of the target object in the visual angle boundary of the corresponding visual angle according to the preset acquisition rules, specifically including: firstly, acquiring a distance to be acquired between the target object and an acquisition apparatus under each visual angle, then setting a preset number which refers to the number of the acquisition distances to be segmented, and acquiring corresponding image information at each segmentation point under the corresponding visual angle, and/or segmented image information after segmenting through the image segmentation step; and finally, after the segmented image information at each segmentation point under the same visual angle is acquired, fusing all the cut image information according to a fusion rule so as to obtain fused image information under the same visual angle. For example, in case of a visual angle 1, a visual angle 2, a visual angle 3, a visual angle 4 and a visual angle N, the method comprises: firstly, acquiring the acquisition distance between the acquisition apparatus and the target object under the visual angle 1, then setting the preset number needing to be segmented, if the preset number is 3, acquiring the segmented image information at each segmentation distance or segmentation point, namely acquiring the segmentation image information 1 at the segmentation distance 1, the segmentation image information 2 at the segmentation distance 2 and the segmentation image information 3 at the segmentation distance 3, and performing fusing on the segmentation image information 1, the segmentation image information 2 and the segmentation image information 3 according to other rules such as the segmentation distance or the depth of the acquisition apparatus so as to form the fused image information of the target object under the visual angle 1.

It should be noted that the acquisition distances between the target object and the acquisition apparatus under different visual angles can be completely same, partially same or completely different; the preset number of the acquisition distances between the target object and the acquisition apparatus under different visual angles to be segmented can be completely same, partially same or completely different; the segmentation mode of the acquisition distances between the target object and the acquisition apparatus under different visual angles is not limited, uniform segmentation can be performed, dense segmentation can be performed on the position, with much image information, of the target object, and sparse segmentation can be performed on the position, with little image information, of the target object.

When acquiring the image information of the target object, a regular acquisition mode can be adopted, and an irregular acquisition mode can also be adopted; when acquiring the image information of the target object, the image information of the target object under different visual angles at the same moment can be acquired, and the image information of the target object under the same visual angle and/or different visual angles within a period of time can also be acquired.

The acquisition distance between the acquisition apparatus and the target object under the same visual angle is acquired, the acquisition distance is segmented according to the preset number, the corresponding segmented image information is acquired, and multiple segmented images are fused, so that the obtained second image information is clearer, better retains the texture, size and other information of the target object, improves the accuracy of the image, and carries less noise information, which is helpful to make the reproduction of the interactive control target object smoother and faster, further improving the user experiences.

Further, after first target image information and/or second target image information of the target object is acquired, an attribute number is established for the first image information and/or the second image information, and the image information is stored in a preset position according to the attribute number. The attribute number can be established according to the visual angle information, the direction information (such as the U and V directions, it can be understood as the longitude and latitude of a circumscribed sphere formed by the visual angle boundary), the time information and the like in acquisition of the image information, and the format can be set as P-U-V-W, and can also be a nested format P (W(U(V))), for example, the attribute number of the image information acquired under the visual angle 1 can be 1-30-45-5, 0001 and a&b&c*, and the specific establishment rule of the attribute number is not limited herein as long as the image information under the current visual angle and/or direction at the current moment can be represented. Then, the acquired first target image information and/or the second target image information is stored in a preset position of a database or a memory and the like according to the established attribute number; for example, the attribute number is used as an index, the image information is used as content and is stored in a table of a relational database (such as MYSQL), and the attribute number can also be used as a key, and the image information is used as a value of a key-value pair and written into the memory (such as a non-relational database Redis), so that corresponding data can be quickly found according to the attribute number; and for the attribute number P (W(U(V)) corresponding to the nested format, the corresponding image information can also be stored in a file system (such as a hard disk and a magnetic disk) in a nested folder form, for example, the file folder path P1/W1/U1/V1 and P1/W2/U1/V2 can respectively be used for storing the image information in time W1 and time W2 at different directions (or the same direction) under the visual angle P1.

Further, the acquiring the target image information of the target object according to the combination of the plurality of direction control parameters, and then performing three-dimensional reproduction on the target object based on the direction control parameters and the target image information specifically includes:

acquiring the attribute number based on the first direction control parameter and/or the second direction control parameter and/or the visual angle control parameter and the time control parameter;

acquiring the target image information corresponding to the target object from the preset position according to the attribute number;

establishing the coordinate system based on the first direction control parameter, the second direction control parameter, the visual angle control parameter and/or the time control parameter;

performing three-dimensional reproduction on the target object in the coordinate system by the target image information.

Figure 3:
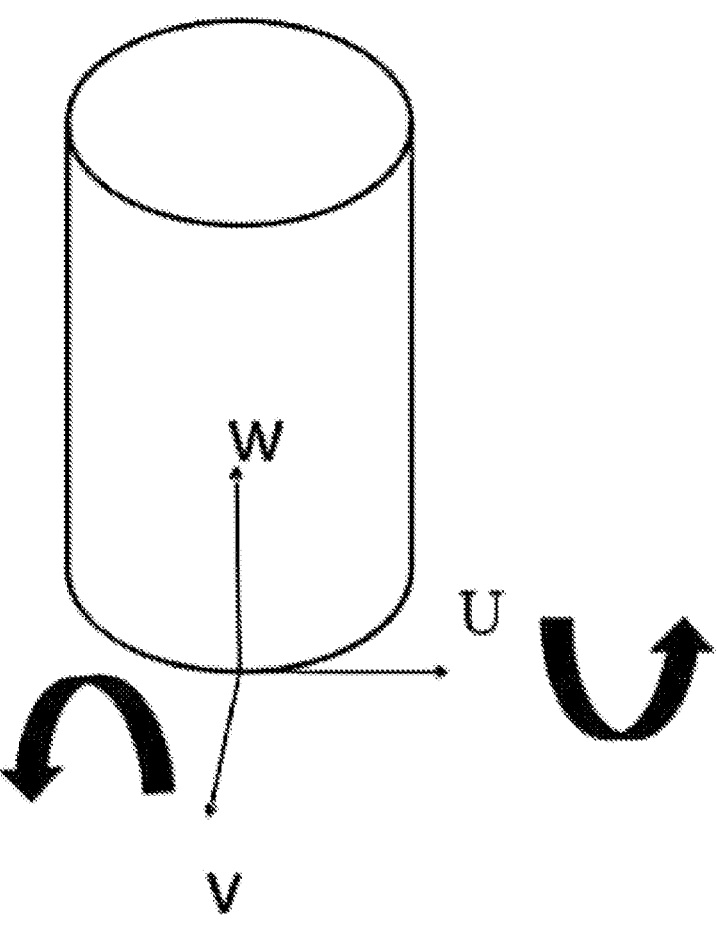
FIG. 3 is a structural representation of a specific embodiment of a U-V-W coordinate system in the present invention.

In the embodiment of the present invention, a specific P-U-V-W attribute number can be formed according to the first direction control parameter (U or V) and/or the second direction control parameter (U or V) and/or the visual angle control parameter (which can be represented by P) and the time control parameter (W) in the control instruction input by the user according to an interaction requirement, and then corresponding target image information is acquired from a pre-stored position according to the attribute number; and generally, the center of mass (or other places, such as an upper surface or a lower surface) of the target object is used as a coordinate origin to establish a U-V-W coordinate system shown in FIG. 3, and then the corresponding target image information acquired according to the attribute number of the U-V-W is loaded into the coordinate system for static or dynamic reproduction of the target object, so that the user can statically or dynamically observe the target object and the change condition of the target object from multiple directions according to requirements.

Figure 4:
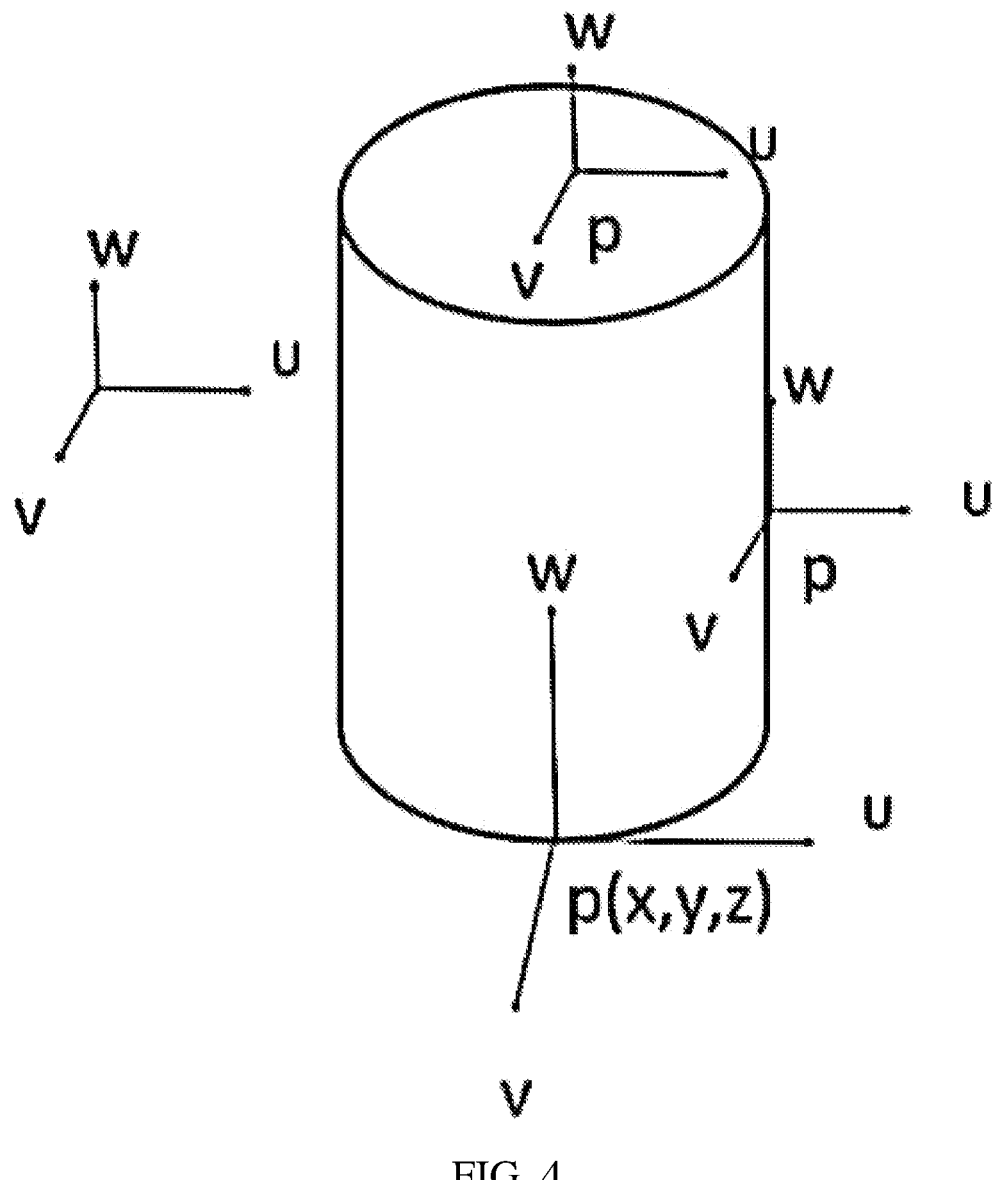
FIG. 4 is a structural representation of a specific embodiment of a U-V-W-P coordinate system in the present invention.

It should be noted that any visual angle P of the target object can be used as the coordinate origin to establish a U-V-W-P coordinate system shown in FIG. 4, wherein the visual angle P can be on the surface of the target object or not, for example, the visual angle P can be a point on the circumscribed sphere of the visual angle boundary; and then corresponding target image information acquired according to the attribute number of the U-V-W-P is loaded into the coordinate system for static or dynamic reproduction of the target object. The movement and reproduction of the target object in the first direction and/or the second direction (U and/or V) under any visual angle based on the obtained high-precision target image information at any moment or within a period of time can be controlled, so that the user can observe the target object and interactively control the target object in a static or dynamic omnibearing and high-precision manner under any visual angle according to requirements, and the experience feeling of the user for interactively controlling the target object is improved.

Those skilled in the art can understand that the realization of all or part of the processes in the methods of the above embodiments can be accomplished by instructing relevant hardware through the computer program, which can be stored in the computer readable storage medium. When the program is executed, it can include the processes of the embodiments of the above methods. The aforementioned storage media can be non-volatile storage media such as a magnetic disc, an optical disk, a read-only memory (ROM), or a random access memory (RAM).

It should be understood that although the various steps in the flow chart of the accompanying drawings are displayed sequentially as indicated by the arrow, these steps are not necessarily executed sequentially according to the order indicated by the arrow. Unless otherwise specified herein, there is no strict order for execution of these steps, and they can be executed in other orders. Furthermore, at least some of the steps in the flow chart of the accompanying drawings may include multiple sub-steps or multiple stages, and these sub-steps or stages are not necessarily executed at the same time, but may be executed at different times; they are not necessarily executed sequentially, but may be executed alternately with at least a part of other steps or sub-steps or stages of other steps.

Figure 5:
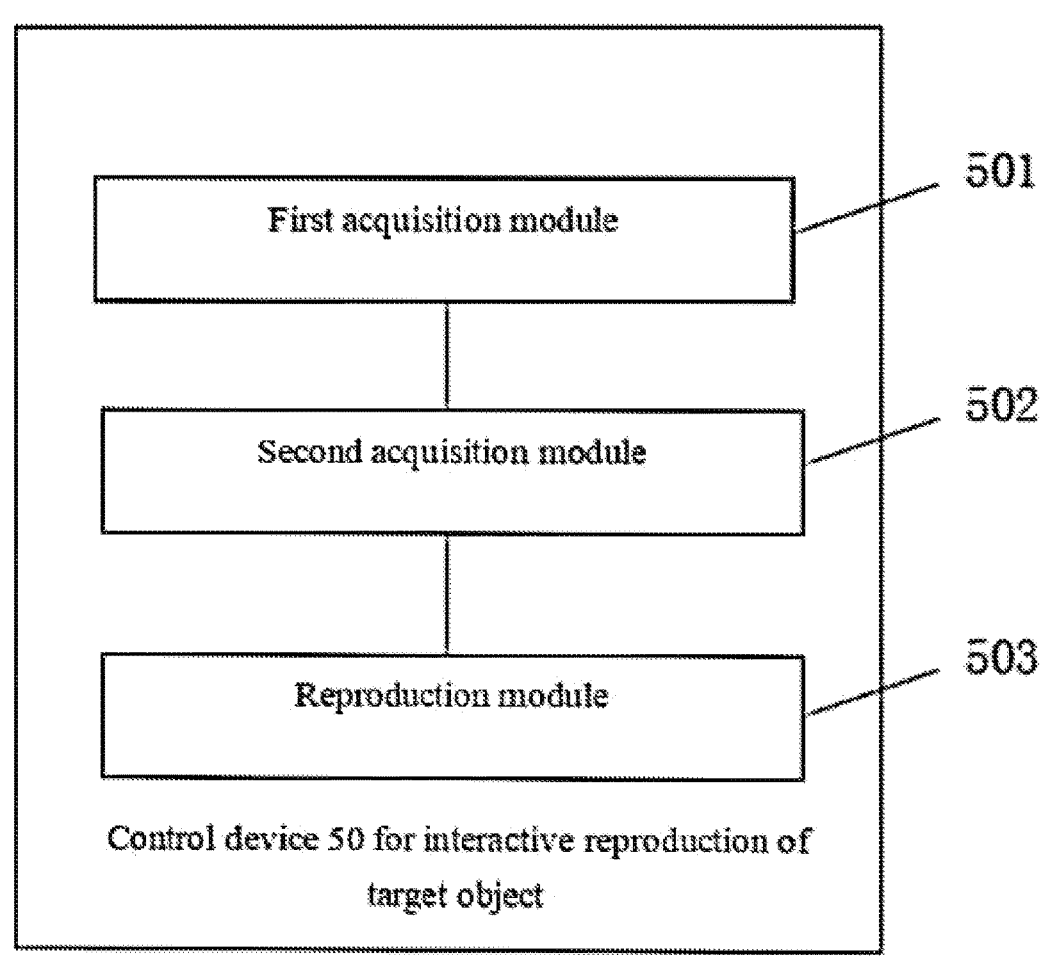
FIG. 5 is a structural representation of an embodiment of a control device for interactive reproduction of a target object in the present invention.

Further referring to FIG. 5, as the implementation of the method shown in FIG. 2, the present invention provides an embodiment of a control device for interactive reproduction of a target object, the device embodiment corresponds to the method embodiment shown in FIG. 2, and the control device for interactive reproduction of the target object can be specifically applied to various electronic equipment.

As shown in FIG. 5, the control device 500 for interactive reproduction of the target object described in this embodiment includes:

a first acquisition module 501 which is used for acquiring the control instruction of the target object, the control instruction including the plurality of direction control parameters;

a second acquisition module 502 which is used for acquiring target image information of the target object according to the combination of the plurality of direction control parameters, the target image information being acquired through the preset three-dimensional reproduction method;

a reproduction module 503 which is used for performing interactive reproduction on the target object based on the target image information.

The control device for the interactive reproduction of the target object provided by the examples of the present invention can realize the various embodiments of the control method of interactive reproduction of the target object, and corresponding beneficial effects. It is not described herein for avoidance of repetition.

Figure 6:
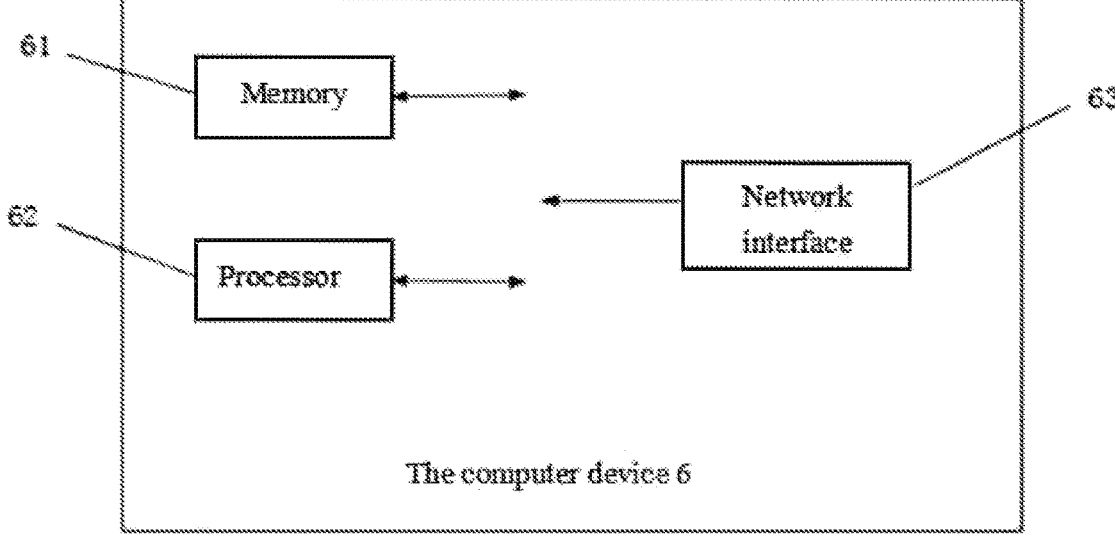
FIG. 6 is a structural representation of a computer device in the present invention.

In order to solve the above technical problems, embodiments of the present invention further provide a computer device. For details, please refer to FIG. 6. FIG. 6 is a structural representation of a computer device in the present invention.

The computer device 6 includes a memory 61, a processor 62, and a network interface 63 connected to each other through a system bus for communication. It should be noted that only the computer device 6 with components 61-63 is shown in the figure, but it should be understood that it is not required to implement all the showed components, and more or fewer components may be implemented alternatively. Among them, those skilled in the art can understand that the computer device herein is a device that can automatically perform numerical calculation and/or information processing according to preset or stored instructions, and its hardware includes but is not limited to microprocessors, ASIC (Application Specific Integrated Circuit, ASIC), FPGA (Field-Programmable Gate Array, FPGA), Digital Signal Processor (DSP), embedded devices, etc.

The computer device can be desktop computer, notebook, palmtop computer and cloud server, etc. The computer device can perform human-computer interaction with the users via keyboard, mouse, remote controller, touch panel or voice control device, etc.

The memory 61 comprises at least one type of readable storage medium, and the readable storage medium comprises flash memory, hard disk, multimedia card, card memory (for example, SD or DX memory etc.), random access memory (RAM)), static random access memory (SRAM), read-only memory (ROM), electrically erasable programmable read-only memory (EEPROM), programmable read-only memory (PROM), magnetic memory, magnetic disk, optical disk, etc. In some embodiments, the memory 61 may be an internal storage unit of the computer device 6, for example, a hard disk or memory of the computer device 6. In other embodiments, the memory 61 can also be an external storage device of the computer device 6, for example, a plug-in hard disk equipped on the computer device 6, a smart media card (SMC), a secure digital (SD) card, and a flash card, etc. Definitely, the memory 61 may also include both the internal storage unit of the computer device 6 and the external storage device thereof. In this embodiment, the memory 61 is generally used to store the operating system and various application software installed in the computer device 6, for example, the program code of the control method for the interactive reproduction of the target object. In addition, the memory 61 can also be used to temporarily store various types of data that have been output or will be output.

In some embodiments, the processor 62 may be a central processing unit (CPU), a controller, a microcontroller, a microprocessor, or other data processing chips. The processor 62 is generally used to control the general operation of the computer device 6. In this embodiment, the processor 62 is configured to run program codes stored in the memory 61 or process data, for example, run program codes of a control method for interactive reproduction of the target object.

The network interface 63 may include a wireless network interface or a wired network interface, and the network interface 63 is generally used to establish a communication connection between the computer device 6 and other electronic devices.

The present application also provides another mode of implementation, i.e. a computer-readable storage medium. The computer-readable storage medium stores the control program of interactive reproduction for the target object, and the control program of interactive reproduction for the target object can be executed by at least one processor, so that at least one processor executes the steps of the control method for interactive reproduction of the target object as described above.

Through the description of the above embodiments, those skilled in the art can clearly understand that the method of the foregoing embodiments can be realized by means of software plus a necessary general-purpose hardware platform, or certainly by hardware, but in many cases, the former is a better implementation. Based on such an understanding, the technical solution of the present application can be embodied in the form of a software product in essence or the part that contributes to the prior art, and the computer software product is stored in a storage medium (such as ROM/RAM, disk, CD) that contains a plurality of instructions, such that one terminate device (a mobile phone, a computer, a server, an air conditioner, or a network device, etc.) can execute the methods described in the various embodiments of the present application.

The foregoing description merely describes the preferred embodiments of the present invention, and is not intended to limit the present invention. Any modification, equivalent replacement and improvement etc. made within the spirit and principles of the present invention shall fall within the scope of protection of the present invention.

What is claimed is:

1. A control method for interactive reproduction of a target object, the target object being a real tangible object or a virtual object, the method comprising following steps:

acquiring a control instruction of the target object, the control instruction including a plurality of direction control parameters;

acquiring target image information of the target object according to a combination of the plurality of direction control parameters;

performing interactive reproduction of the target object based on the direction control parameters and the target image information;

wherein the plurality of direction control parameters comprise a first direction control parameter, a second direction control parameter and a time control parameter;

the control instruction further comprises a visual angle control parameter;

the target image information comprises first image information, and the step of acquiring the first image information comprises:

calculating visual angle boundaries of the target object under a plurality of preset visual angles, wherein under each preset visual angle, a corresponding one of the visual angle boundaries is calculated by:

acquiring an image of the target object displayed under the preset visual angle, calculating a central position of the target object in the image of the target object displayed under the preset visual angle, calculating a corresponding maximum boundary radius by taking the central position as a circle center, and taking an edge of a circle or a sphere formed by the maximum boundary radius as a visual angle boundary under the preset visual angle such that the target object can be completely contained in the visual angle boundary under the preset visual angle;

acquiring image information of the target object under the plurality of preset visual angles in the corresponding one of the visual angle boundaries, wherein an ellipse edge jointly formed by combining maximum boundary radii of two or more visual angles of the plurality of preset visual angles is used as the corresponding one of the visual angle boundaries;

performing boundary processing on the image information to obtain the first image information of the target object under the plurality of preset visual angles.

2. The method according to claim 1, wherein the target image information further comprises second image information, and the step of acquiring the second image information comprises:

controlling an acquisition device to acquire image information used for forming the second image information under the plurality of preset visual angles according to a preset acquisition rule;

segmenting and fusing the image information used for forming the second image information under the same visual angle to obtain fused image information, wherein segmenting and fusing the image information used for forming the second image information comprises:

acquiring an acquisition distance between the acquisition device and the target object under the same visual angle, setting multiple segmentation distances from the acquisition distance, respectively acquiring segmentation image information at the multiple segmentation distances, and performing fusing on the segmentation image information so as to form fused image information of the target object under the same visual angle;

acquiring the fused image information under the plurality of preset visual angles to form the second image information of the target object.

3. The method according to claim 2, wherein the method further comprises:

establishing an attribute number for the first image information and/or the second image information, and storing the first image information and/or the second image information in a preset position according to the attribute number, and the attribute number is established according to a visual angle information, a direction information, or a time information in acquisition of the first image information and/or the second image information to represent a current visual angle and/or a direction at a current moment of the acquisition of the first image information and/or the second image information.

4. The method according to claim 3, wherein the acquiring the target image information of the target object according to the combination of the plurality of direction control parameters comprises:

obtaining the attribute number based on the first direction control parameter and/or the second direction control parameter and/or the visual angle control parameter and the time control parameter; and acquiring the target image information corresponding to the target object from the preset position according to the attribute number.

5. The method according to claim 4, wherein the performing interactive reproduction on the target object based on the direction control parameters and the target image information comprises:

establishing a coordinate system based on the first direction control parameter, the second direction control parameter, the visual angle control parameter and/or the time control parameter;

performing interactive reproduction on the target object in the coordinate system by the target image information.

6. A control device for interactive reproduction of a target object, comprising:

a first acquisition module which is used for acquiring a control instruction of the target object, the control instruction including the plurality of direction control parameters;

a second acquisition module which is used for acquiring target image information of the target object according to a combination of a plurality of direction control parameters, wherein the plurality of direction control parameters comprise a first direction control parameter, a second direction control parameter and a time control parameter;

the target image information comprises first image information, and the step of acquiring the first image information comprises:

calculating visual angle boundaries of the target object under a plurality of preset visual angles, wherein under each preset visual angle, a corresponding one of the visual angle boundaries is calculated by:

acquiring an image of the target object displayed under the preset visual angle, calculating a central position of the target object in the image of the target object displayed under the preset visual angle, calculating a corresponding maximum boundary radius by taking the central position as a circle center, and taking an edge of a circle or a sphere formed by the maximum boundary radius as a visual angle boundary under the preset visual angle such that the target object can be completely contained in the visual angle boundary under the preset visual angle;

acquiring image information of the target object under the plurality of preset visual angles in the corresponding one of the visual angle boundaries, wherein an ellipse edge jointly formed by combining maximum boundary radii of two or more multiple visual angles of the plurality of preset visual angles is used as the corresponding one of the visual angle boundaries; performing boundary processing on the image information to obtain the first image information of the target object under the plurality of preset visual angles;

a reproduction module which is used for performing interactive reproduction of the target object based on the target image information.

7. A computer device, comprising a processor; and a memory having a computer program stored thereon, wherein the computer program, when executed by the processor, causes the processor to perform the control method of claim 1.

8. A non-transitory computer readable storage medium, storing a computer program that, when executed by a processor, causes the processor to perform the control method of claim 1.

* * * * *